(12) United States Patent
Okada

(10) Patent No.: US 11,485,321 B2
(45) Date of Patent: Nov. 1, 2022

(54) VEHICLE UNLOCKING DEVICE AND VEHICLE EQUIPPED THEREWITH, UNLOCKING SYSTEM, AND RECORDING MEDIUM STORED WITH PROGRAM

(71) Applicant: TOYOTA JIDOSHA KABUSHIKI KAISHA, Toyota (JP)

(72) Inventor: Hiroki Okada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 244 days.

(21) Appl. No.: 16/659,645

(22) Filed: Oct. 22, 2019

(65) Prior Publication Data

US 2020/0180560 A1 Jun. 11, 2020

(30) Foreign Application Priority Data

Dec. 10, 2018 (JP) .............................. JP2018-231222

(51) Int. Cl.
*B60R 25/30* (2013.01)
*E05B 81/54* (2014.01)
*B60R 25/25* (2013.01)
*G06V 40/16* (2022.01)
*H04W 88/02* (2009.01)

(52) U.S. Cl.
CPC ............ *B60R 25/305* (2013.01); *B60R 25/25* (2013.01); *E05B 81/54* (2013.01); *G06V 40/166* (2022.01); *G06V 40/172* (2022.01); *H04W 88/02* (2013.01)

(58) Field of Classification Search
CPC ....... B60R 25/305; B60R 25/25; E05B 81/54; G06K 9/00255; G06K 9/00288
See application file for complete search history.

(56) References Cited

U.S. PATENT DOCUMENTS

| | | | |
|---|---|---|---|
| 9,712,741 B2* | 7/2017 | Kothari | B60R 11/0235 |
| 10,343,486 B2* | 7/2019 | Chundrlik, Jr. | H04N 7/181 |
| 10,437,937 B2* | 10/2019 | Kilaru | G06F 9/45558 |
| 10,486,505 B2* | 11/2019 | Lee | B60J 3/0204 |
| 10,657,343 B1* | 5/2020 | Studnicka | G06Q 20/14 |
| 2006/0089185 A1* | 4/2006 | Han | B60R 25/33 455/575.1 |
| 2015/0360618 A1* | 12/2015 | Richard | B60R 11/0252 348/148 |

(Continued)

FOREIGN PATENT DOCUMENTS

| | | |
|---|---|---|
| JP | 2004-270347 A | 9/2004 |
| JP | 2006-59230 A | 3/2006 |

(Continued)

*Primary Examiner* — Md K Talukder
(74) *Attorney, Agent, or Firm* — Oblon, McClelland, Maier & Neustadt, L.L.P.

(57) ABSTRACT

A vehicle unlocking device, including: a memory; a processor connected to the memory; and a reception section configured to receive identification information assigned to respective vehicles, from a terminal carried by a person present at a periphery of a specific vehicle that is one of the respective vehicles, the processor being configured to: acquire an image captured by an imaging section provided at the specific vehicle, and unlock a lock unit of the specific vehicle in a case in which the identification information that has been received is identification information corresponding to the specific vehicle and an image of the person has been acquired.

11 Claims, 14 Drawing Sheets

(56) References Cited

U.S. PATENT DOCUMENTS

| | | | | |
|---|---|---|---|---|
| 2016/0300050 A1* | 10/2016 | Hecht | ................ | H04W 12/06 |
| 2017/0013188 A1* | 1/2017 | Kothari | ................ | B60R 1/00 |
| 2018/0236849 A1* | 8/2018 | Lee | ................ | B60J 3/0204 |
| 2019/0366981 A1* | 12/2019 | Huang | ................ | B60R 25/252 |
| 2020/0073520 A1* | 3/2020 | Mohan | ................ | H04W 4/021 |
| 2020/0090224 A1* | 3/2020 | Falconer | ................ | G02B 27/01 |
| 2020/0180560 A1* | 6/2020 | Okada | ................ | B60R 25/305 |
| 2020/0402480 A1* | 12/2020 | Ueda | ................ | G06Q 30/0266 |
| 2021/0108926 A1* | 4/2021 | Tran | ................ | G06N 3/04 |

FOREIGN PATENT DOCUMENTS

| | | |
|---|---|---|
| JP | 2013-036251 A | 2/2013 |
| JP | 2018-13002 A | 1/2018 |
| JP | 2018-080539 A | 5/2018 |
| JP | 2018-165450 A | 10/2018 |
| JP | 2018-184707 A | 11/2018 |

* cited by examiner

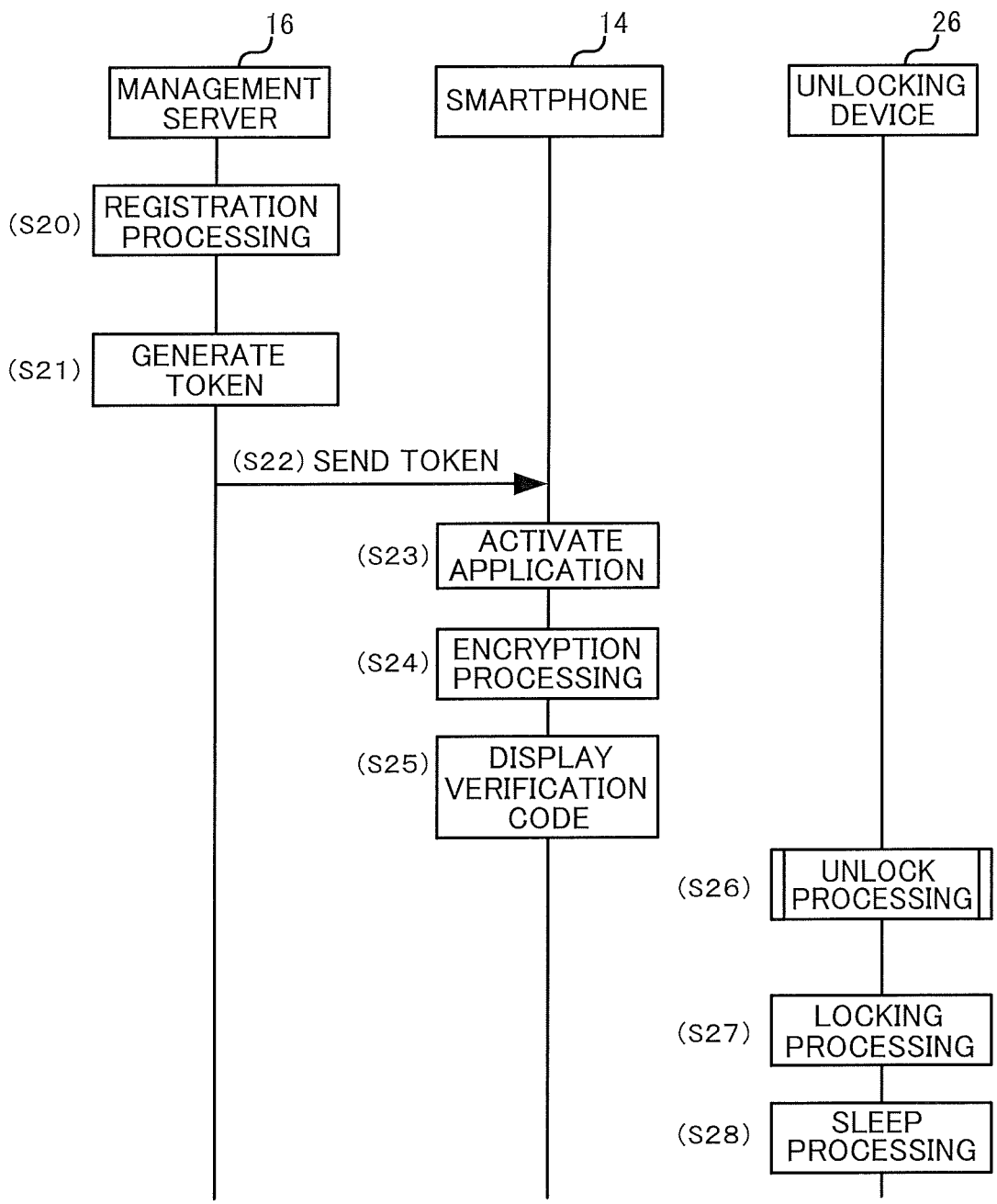

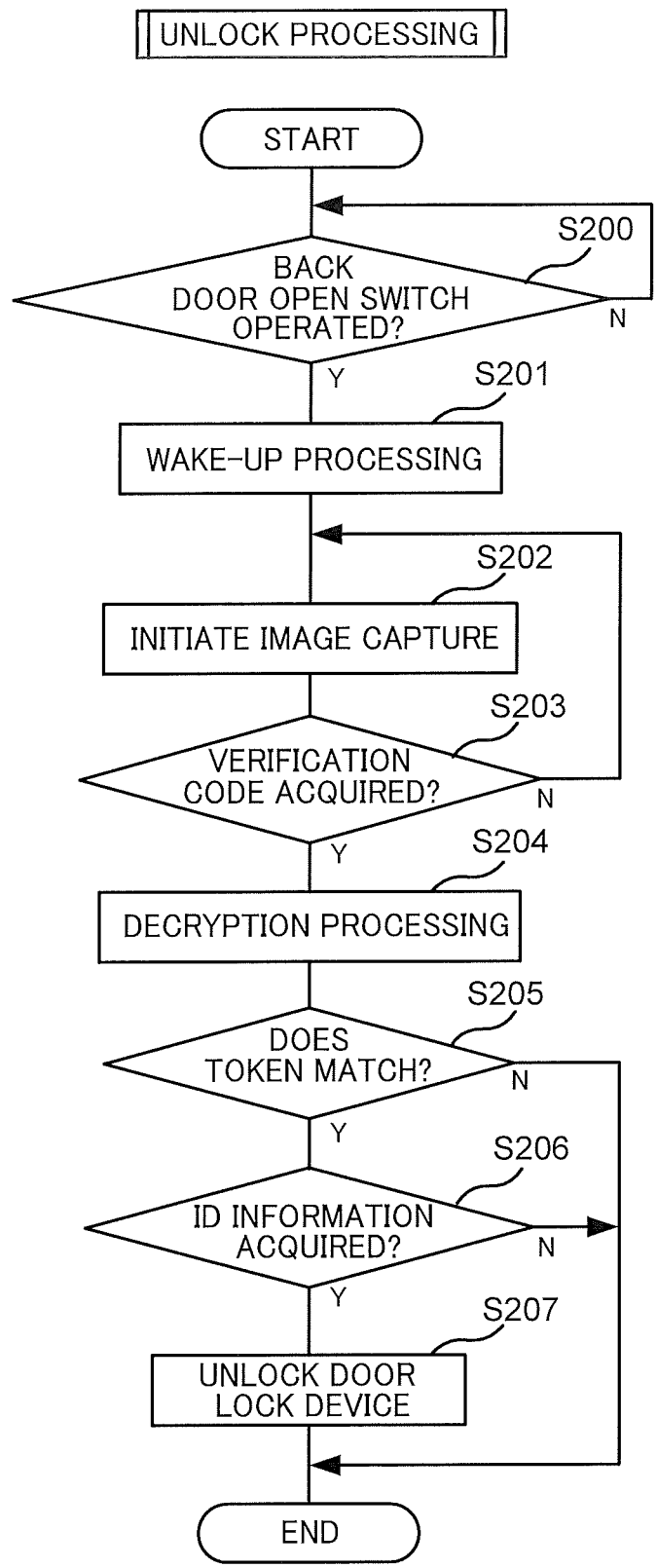

VEHICLE UNLOCKING DEVICE AND VEHICLE EQUIPPED THEREWITH, UNLOCKING SYSTEM, AND RECORDING MEDIUM STORED WITH PROGRAM

CROSS-REFERENCE TO RELATED APPLICATION

This application is based on and claims priority under 35 USC 119 from Japanese Patent Application No. 2018-231222 filed on Dec. 10, 2018, the disclosure of which is incorporated by reference herein.

BACKGROUND

Technical Field

The present disclosure relates to a vehicle unlocking device and a vehicle equipped therewith, and to an unlocking system, and recording medium stored with a program.

Related Art

A keyless entry device is disclosed in Japanese Patent Application Laid-Open (JP-A) No. 2004-270347. This keyless entry device is installed in a vehicle, and unlocks a door lock when there is a match between an image captured by a camera and an authentication image. The keyless entry device performs determination using an authentication image pre-registered in an image memory.

One recently emerging example of a service for delivering packages such as home deliveries is a delivery service in which a package is delivered to the luggage space or the like of a vehicle specified by a customer. In such a delivery service, identification of a person who unlocks the vehicle is desirable in the interest of suppressing unauthorized unlocking of the vehicle.

However, when a keyless entry device such as that disclosed in JP-A No. 2004-270347 is applied to a vehicle that will be employed in such a service, it is not realistic to save authentication images individually for a large number of unspecified people who are involved in delivery on the vehicle side. Moreover, although methods to acquire authentication images via communications might be considered, such authentication images would not be acquirable when the vehicle is located in a location where communications are impeded, such as an underground parking lot, with the result that unlocking of the vehicle could not be performed.

SUMMARY

In consideration of the above circumstances, an object of the present disclosure is to provide a vehicle unlocking device capable of suppressing unauthorized unlocking of a vehicle without needing to pre-register information about the person who will perform the unlocking.

A first aspect is a vehicle unlocking device including a reception section, an acquisition section, and a control section. The reception section is configured to receive identification information assigned to respective vehicles, from a terminal carried by a person present at a periphery of a specific vehicle that is a specific one of the respective vehicles. The acquisition section is configured to acquire an image captured by an imaging section provided at the specific vehicle. The control section is configured to unlock a lock unit of the specific vehicle in a case in which the identification information that has been received is identification information corresponding to the specific vehicle and an image of the person has been acquired by the acquisition section.

The vehicle unlocking device of the first aspect is applied to a case in which the lock unit of the vehicle is unlocked by the terminal carried by the person present at a periphery of the specific vehicle. The "terminal" that sends the identification information to the vehicle unlocking device encompasses, for example, network-connected communication terminals such as smartphones, and handheld devices such as a keyless entry device. The vehicle unlocking device is configured to unlock the lock unit in a case in which the identification information that has been received is identification information corresponding to the specific vehicle to be unlocked, and an image of the person carrying the terminal captured by the imaging section has been acquired. This vehicle unlocking device enables unauthorized unlocking of the vehicle to be suppressed without needing to pre-register information about the person who will perform unlocking.

A vehicle unlocking device of a second aspect is the vehicle unlocking device of the first aspect, wherein the control section is configured to unlock the lock unit, in a case in which a face of the person is included in excess of a predetermined proportion in the captured image.

In the vehicle unlocking device of the second aspect, a condition of the face being captured in excess of the predetermined proportion in the image of the person carrying the terminal is set as an unlock condition. This vehicle unlocking device enables an improvement in the accuracy of identification of the person carrying the terminal to be achieved using a simple method.

A vehicle unlocking device of a third aspect is the vehicle unlocking device of the first aspect or the second aspect, wherein the control section is configured to unlock the lock unit, in a case in which a predetermined element of a face of the person is included in the captured image.

In the vehicle unlocking device of the third aspect, a condition of the predetermined element being included in the image of the face of the person is set as an unlock condition. The "predetermined element" indicates a region of the face enabling identification of the person captured in the image, such as the eyes, nose, mouth, or the like. This vehicle unlocking device enables unlocking to be suppressed in a case in which the imaged person is not identifiable, for example due to hiding their face with sunglasses or a mask.

A vehicle unlocking device of a fourth aspect is the vehicle unlocking device of any one of the first aspect to the third aspect, further comprising a processing section configured to implement a state enabling the image to be captured, in a case in which the identification information received is the identification information corresponding to the specific vehicle.

In the vehicle unlocking device of the fourth aspect, the processing section can implement a state enabling the image to be captured in a case in which the identification information received has been determined to be the identification information corresponding to the specific vehicle, and can shut off the power supply to devices involved in imaging in other cases. This vehicle unlocking device enables unnecessary power consumption to be suppressed.

A fifth aspect is a vehicle unlocking device including an acquisition section, an extraction section, and a control section. The acquisition section is configured to acquire an image captured by an imaging section provided at a specific vehicle. The extraction section is configured to, when an identification image displayed on a terminal carried by a person present at a periphery of the specific vehicle has been acquired by the acquisition section, extract, from the identification image, identification information assigned to each of plurality of the vehicles and unique information related to the person or related to the terminal. The control section is configured to unlock a lock unit of the specific vehicle, in a case in which the identification information that has been extracted is identification information corresponding to the specific vehicle and the unique information has been acquired.

The vehicle unlocking device of the fifth aspect is applied to a case in which the lock unit of the vehicle is unlocked by a terminal carried by a person present at a periphery of the specific vehicle. The "terminal" that displays the identification image to the vehicle unlocking device encompasses, for example, network-connected communication terminals including a display section, such as smartphones. The vehicle unlocking device is configured to unlock the vehicle in a case in which the identification information that has been extracted from the acquired identification image is identification information corresponding to the specific vehicle to be unlocked, and the unique information extracted from the identification image has been acquired. This vehicle unlocking device enables unauthorized unlocking of the vehicle to be suppressed without needing to pre-register information about the person who will perform unlocking.

A sixth aspect is a vehicle including the vehicle unlocking device of any one of the first aspect to the fifth aspect, the imaging section being provided in order for an occupant to observe an exterior of the vehicle, and the lock unit being configured to lock and unlock an opening-closing section separating at interior of the vehicle from the exterior of the vehicle.

The vehicle of the sixth aspect is already provided with the imaging section for an occupant to observe an exterior of the vehicle. For example, the imaging section corresponds to a component of a separate device, such as a back monitoring camera, a camera employed in a blind spot monitor, a camera employed in an electronic mirror, or the like. This vehicle is accordingly able to suppress costs related to the vehicle unlocking device by employing an imaging section that is already installed to the vehicle.

A seventh aspect is an unlocking system including the vehicle of the sixth aspect, a server containing the identification information as temporary use identification information, and the terminal being configured to receive the identification information when the identification information is sent from the server.

In the unlocking system of the seventh aspect, temporary use identification information is provided to the terminal from the server during in order to perform unlocking of the vehicle. This unlocking system is thereby able to suppress repeated unlocking, and hence able to suppress unauthorized unlocking of the vehicle.

The present disclosure is capable of suppressing unauthorized unlocking of a vehicle without needing to pre-register information about the person who will perform the unlocking.

BRIEF DESCRIPTION OF THE DRAWINGS

Exemplary embodiments of the present disclosure will be described in detail based on the following figures, wherein:

FIG. 13 is a sequence chart illustrating a flow of processing in an unlocking system of the second exemplary embodiment; and FIG. 14 is a flowchart illustrating an example of a flow of unlock processing executed in a vehicle unlocking device of the second exemplary embodiment.

DETAILED DESCRIPTION

Explanation follows regarding an unlocking system, a vehicle, and a vehicle unlocking device according to exemplary embodiments of the present disclosure, with reference to FIG. 1 to FIG. 14. An unlocking system 10 according to an exemplary embodiment is applicable to cases in which a delivery provider is delivering a package to a vehicle 12 as a delivery destination. The vehicle 12 corresponds to a specific vehicle in which the package is to be placed. A vehicle unlocking device (hereafter referred to simply as an "unlocking device") 26 is installed in the vehicle 12.

First Exemplary Embodiment

Figure 1:
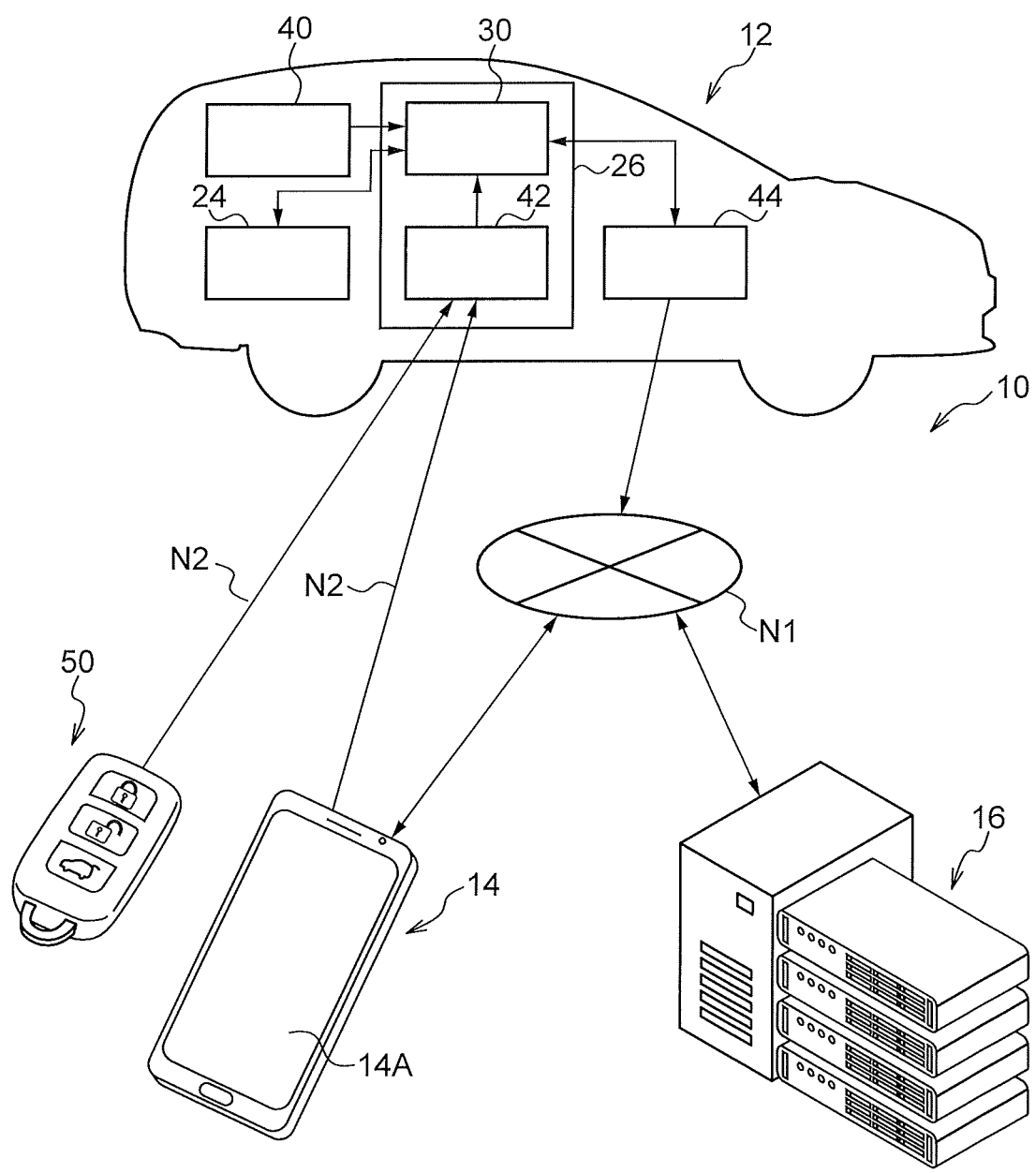
FIG. 1 is a diagram illustrating a schematic configuration of an unlocking system according to an exemplary embodiment.

FIG. 1 is a block diagram illustrating a schematic configuration of the unlocking system 10 according to a first exemplary embodiment.

Overall Configuration

As illustrated in FIG. 1, the unlocking system 10 according to the present exemplary embodiment is configured including the vehicle 12, a smartphone 14 serving as a terminal for unlocking the vehicle 12, and a management server 16 serving as a server to transmit an ID code to the smartphone 14. The unlocking system 10 also includes a remote control key 50 that is a handheld device specific to the vehicle 12 for unlocking the vehicle 12.

The vehicle 12, the smartphone 14, and the management server 16 are each configured so as to be capable of communicating with each other over a network N1. The vehicle 12 includes a communication device 44, described later, connected to the network N1. The network N1 encompasses both mobile communications services such as 3G and LTE, and an Internet connection. The vehicle 12 is also configured so as to be capable of receiving local communication N2 directly from the smartphone 14 and the remote control key 50, without the use of a network. The communication N2 encompasses both wireless communication and infrared communication.

Vehicle

Figure 2:
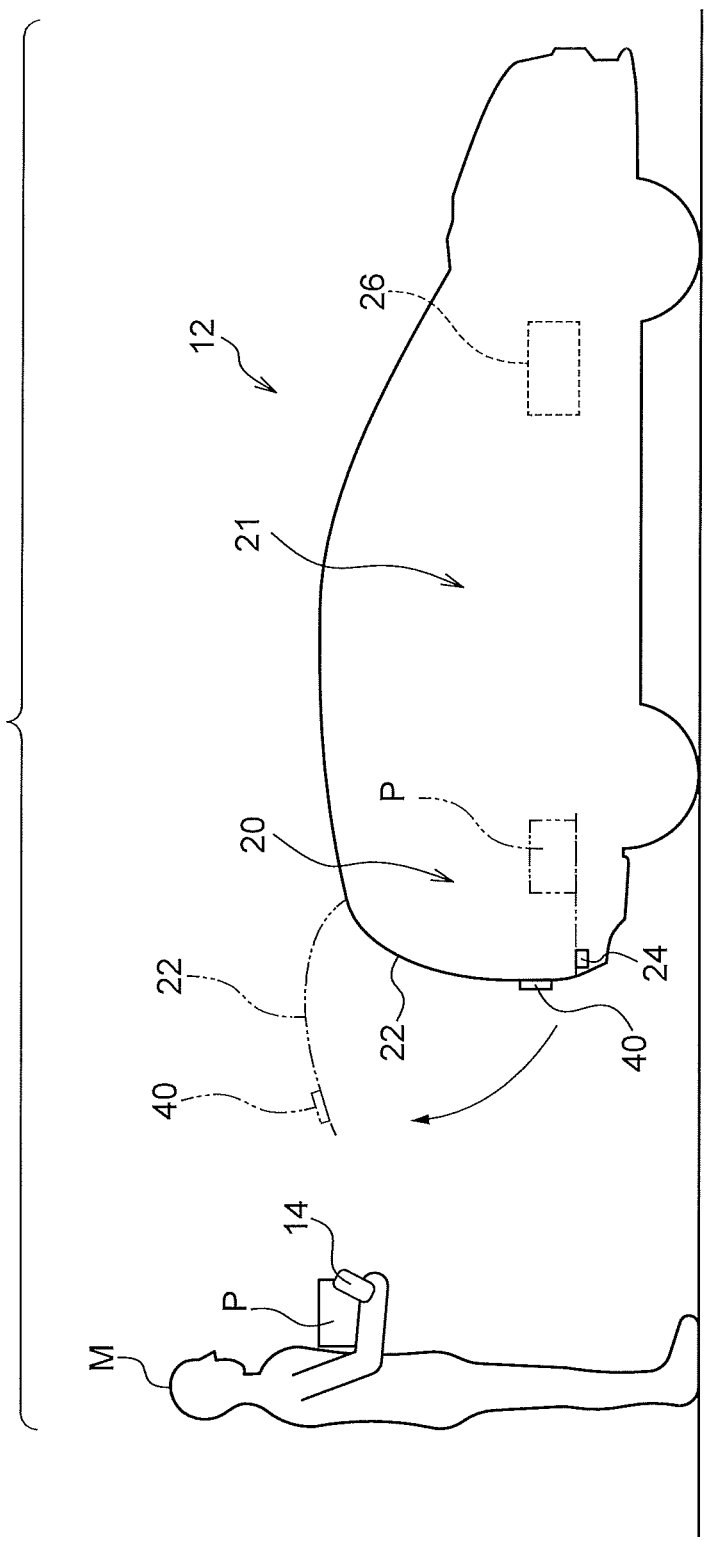
FIG. 2 is a diagram illustrating a structure of a vehicle in an unlocking system according to an exemplary embodiment.

As illustrated in FIG. 2, the vehicle 12 is configured including a luggage space 20 in which a delivered package P can be placed, and, at the rear of the vehicle, a back door 22 serving as an opening-closing section covering the luggage space 20 and capable of opening and closing. The back door 22 separates the interior of the vehicle from the exterior of the vehicle, and the luggage space 20 corresponds to the interior of the vehicle.

The back door 22 can be switched between being locked or being unlocked by a door lock device 24, serving as a lock unit. The door lock device 24 includes a lock mechanism to lock the back door 22, an actuator 24A to drive the lock mechanism, and a back door open switch 24B to electronically release a latched state of the back door 22 (see FIG. 3). "Locked" for the door lock device 24 indicates a locked state of the back door 22, and "unlocked" for the door lock device 24 indicates an unlocked state of the back door 22.

A back monitoring camera 40 serving as an imaging section is also provided to the back door 22 of the present exemplary embodiment. The back monitoring camera 40 is a camera to augment the field of view to the rear of the vehicle 12, and images captured thereby are displayable on a display device provided in a vehicle cabin 21. The back monitoring camera 40 of the present exemplary embodiment is configured so as to be capable of imaging peripherally to the vehicle 12, and specifically so as to be capable of imaging a delivery person M who is a person standing at the rear of the vehicle. Captured images of the delivery person M encompass not only video but also still images.

Figure 3:
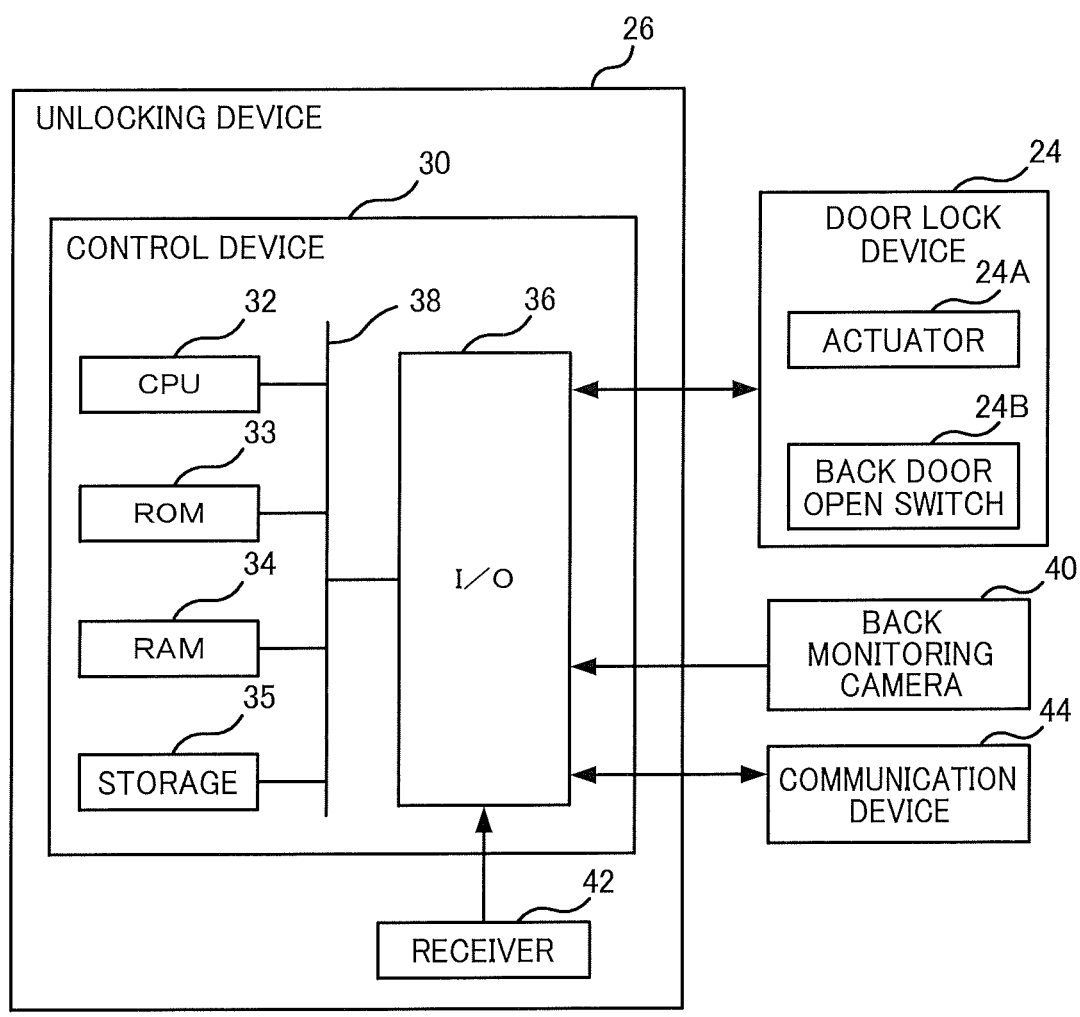
FIG. 3 is a block diagram illustrating a hardware configuration of a vehicle unlocking device.

As illustrated in FIG. 1 and FIG. 3, the vehicle 12 includes the unlocking device 26 and a communication device 44 in addition to the door lock device 24 and the back monitoring camera 40 described above. The door lock device 24, the back monitoring camera 40, and the communication device 44 are electrically connected to the unlocking device 26. The unlocking device 26 also includes a control device 30, and a receiver 42 serving as a reception section. Note that although in the present exemplary embodiment the communication device 44 is configured as a separate body to the unlocking device 26, there is no limitation thereto, and a configuration in which the communication device 44 is included in the unlocking device 26 may also be adopted.

The unlocking device 26 of the present exemplary embodiment unlocks the door lock device 24 when an ID code sent from the remote control key 50 is a unique ID code for the vehicle 12. The unlocking device 26 also unlocks the door lock device 24 when both an ID code sent from the smartphone 14 is the unique ID code for the vehicle 12 and the delivery person M has been imaged by the back monitoring camera 40. The ID code of the present exemplary embodiment is identification information assigned to each vehicle. An example of the ID code of the present exemplary embodiment is a one-time password including a time stamp for temporary use by the smartphone 14.

As illustrated in FIG. 3, the control device 30 includes a central processing unit (CPU) 32 as an example of a hardware processor, read only memory (ROM) 33, random access memory (RAM) 34, storage 35, and an input/output interface (I/O) 36. The CPU 32, the ROM 33, the RAM 34, the storage 35, and the I/O 36 are connected together through a bus 38.

Figure 4:
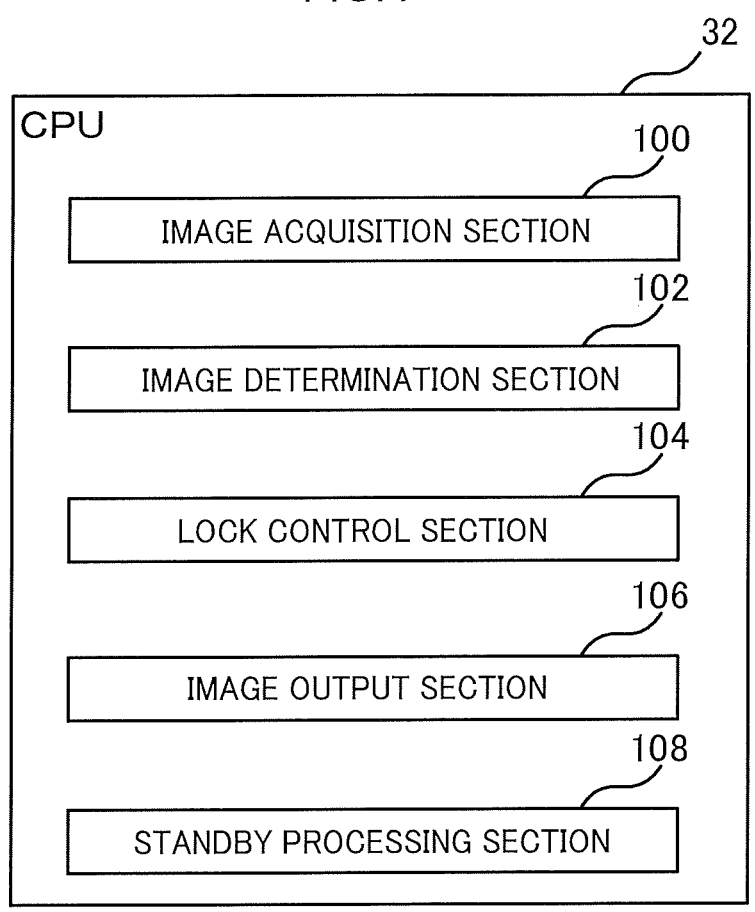
FIG. 4 is a block diagram illustrating an example of a functional configuration of a CPU in a vehicle unlocking device of a first exemplary embodiment.

The CPU 32 is a central processing unit that executes various programs and controls each section. Namely, the CPU 32 reads a program from the ROM 33 and executes the program using the RAM 34 as a work area. In the present exemplary embodiment an execution program is stored in the ROM 33. By executing the execution program the CPU 32 functions as an image acquisition section 100, an image determination section 102, a lock control section 104, an image output section 106, and a standby processing section 108, as illustrated in FIG. 4.

The ROM 33 is stored with the execution program for executing processing related to unlocking in the CPU 32, and data relating to ID codes assigned to each vehicle 12. The RAM 34 serves as a work area to temporarily store programs or data.

The storage 35 serving as a storage section may, for example, be configured by a hard disk drive (HDD) or a solid state drive (SSD), and is capable of storing images captured by the back monitoring camera 40.

The receiver 42, the door lock device 24, the back monitoring camera 40, and the communication device 44 are connected to the I/O 36. Note that the unlocking device 26 may also be connected to the respective devices through various electronic control units (ECU). For example, the door lock device 24 may be connected through a body ECU, and the back monitoring camera 40 may be connected through a car navigation system ECU. The unlocking device 26 and each device may also be connected together through a controller area network (CAN).

FIG. 4 is a block diagram illustrating an example of a functional configuration of the CPU 32 in the present exemplary embodiment. As illustrated in FIG. 4, the CPU 32 includes the image acquisition section 100, the image determination section 102, the lock control section 104, the image output section 106, and the standby processing section 108. Each of the functional configurations is realized by the CPU 32 reading an execution program stored in the ROM 33 and executing the program.

The image acquisition section 100 serving as an acquisition section includes functionality to acquire images captured by the back monitoring camera 40 of the vehicle 12. The acquired images are stored in the storage 35.

The image determination section 102 includes functionality to determine whether or not an image of the delivery person M is included in the images captured by the back monitoring camera 40.

The lock control section 104 serving as a control section includes functionality for controlling the unlocking device 26. In the present exemplary embodiment, a first unlock condition for unlocking is the condition that the received ID code is an ID code corresponding to the vehicle 12, and a second unlock condition is the condition that the image acquisition section 100 has acquired an image of the delivery person M. The lock control section 104 unlocks the door lock device 24 when both the first unlock condition and the second unlock condition are satisfied.

The image output section 106 includes functionality to output images captured by the back monitoring camera 40 to the management server 16. Specifically, the image output section 106 sends an image temporarily stored in the RANI 34 or an image stored in the storage 35 to the management server 16 via the communication device 44.

The standby processing section 108 serving as a processing section includes functionality to control power supply to the back monitoring camera 40 and the communication device 44. The standby processing section 108 of the present exemplary embodiment executes control relating to a sleep mode in which the power supply to the back monitoring camera 40 and the communication device 44 is OFF, and an awake mode in which the power supply to the back monitoring camera 40 and the communication device 44 is ON. The standby processing section 108 of the present exemplary embodiment transitions from the sleep mode to the awake mode when the first unlock condition has been met.

Smartphone

Figure 5:
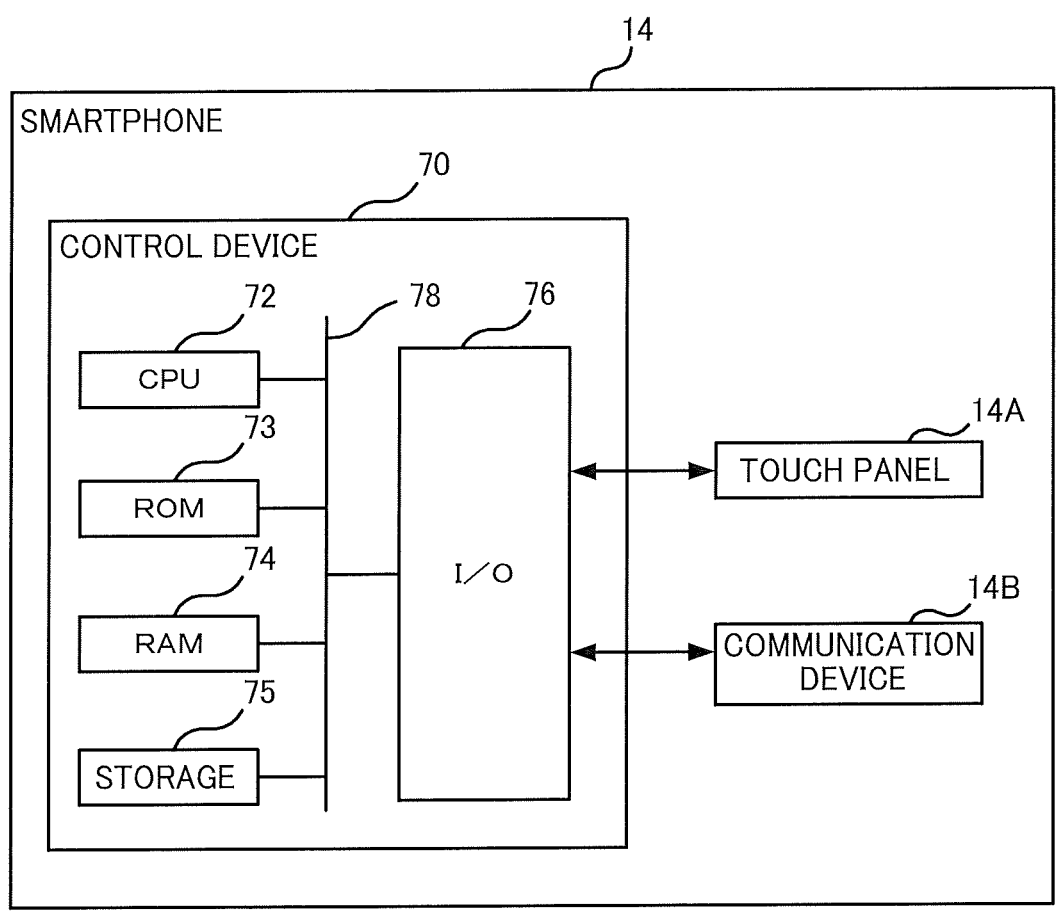
FIG. 5 is a block diagram illustrating a hardware configuration of a smartphone.

The smartphone 14 is a communication terminal carried by the delivery person M. The smartphone 14 of the present exemplary embodiment is configured so as to be capable of receiving an ID code from the management server 16, and also so as to be capable of unlocking the door lock device 24 by sending this ID code to the unlocking device 26. As illustrated in FIG. 5, the smartphone 14 is configured including a control device 70, a touch panel 14A, and a communication device 14B.

The control device 70 includes a CPU 72 as an example of a hardware processor, ROM 73, RAM 74, storage 75, and an I/O 76. The CPU 72, the ROM 73, the RAM 74, the storage 75, and the I/O 76 are connected together through a bus 78.

The CPU 72, the ROM 73, the RAM 74, the storage 75, and the I/O 76 each have similar functions to those of the CPU 32, the ROM 33, the RAM 34, the storage 35, and the I/O 36 described above. Note that as well as internal storage of the smartphone, a micro SD card may also be applied as the storage 75 of the present exemplary embodiment.

The CPU 72 reads a program from the ROM 73 and executes the program using the RAM 74 as a work area. In the present exemplary embodiment, an application program to perform an unlock operation is stored in the ROM 73. By executing the application program the CPU 72 functions as an operation processing section to receive operation by the delivery person M, and as a transmission section to transmit the ID code.

In the control device 70 of the present exemplary embodiment the touch panel 14A and the communication device 14B are connected together through the I/O 76. Note that the touch panel 14A and the communication device 14B may also be directly connected to the bus 78.

Figure 6:
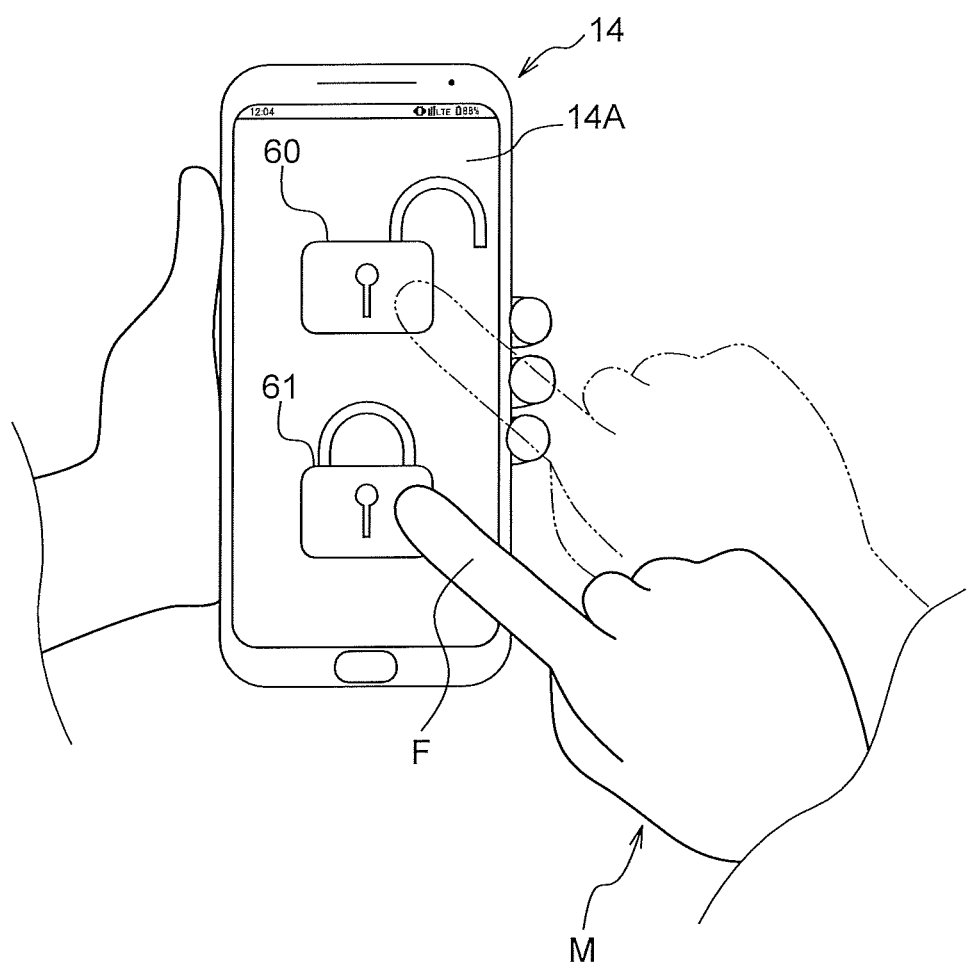
FIG. 6 is a diagram illustrating an example of an application on a smartphone of the first exemplary embodiment.

As illustrated in FIG. 6, when the application program is executed, the CPU 72 serving as an operation processing section displays on the touch panel 14A an unlocked icon 60 illustrating an open padlock, and a locked icon 61 illustrating a closed padlock. When the delivery person M swipes their finger F against the touch panel 14A from the locked icon 61 toward the unlocked icon 60, the operation processing section receives this operation, and the CPU 72 serving as the transmission section sends the ID code to the unlocking device 26 of the vehicle 12.

Management Server

Figure 7:
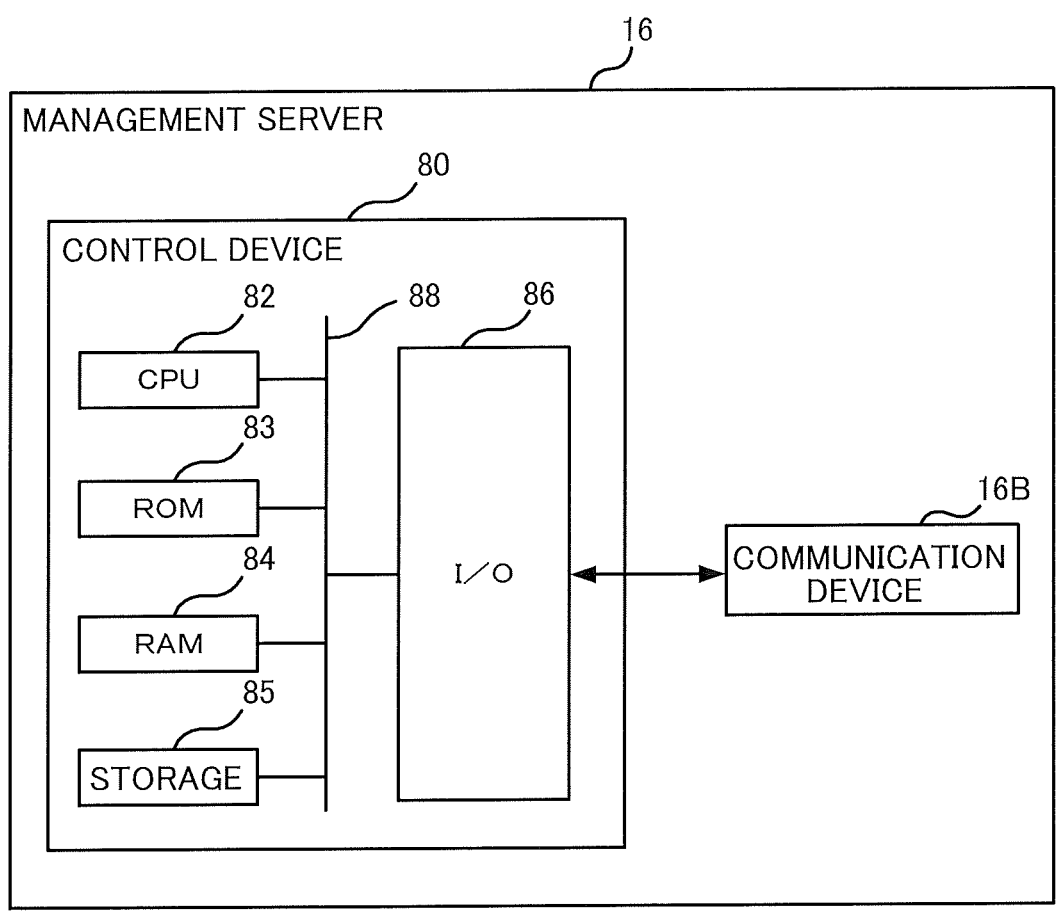
FIG. 7 is a block diagram illustrating a hardware configuration of a management server.

The management server 16 includes functionality to send the ID code employed to unlock the vehicle 12 to the smartphone 14 carried by the delivery person M. The management server 16 also includes functionality to collect images of the delivery person M imaged by the vehicle 12. As illustrated in FIG. 7, the management server 16 is configured including a control device 80 and a communication device 16B.

The control device 80 includes a CPU 82 as an example of a hardware processor, ROM 83, RAM 84, storage 85, and an I/O 86. The CPU 82, the ROM 83, the RAM 84, the storage 85, and the I/O 86 are connected together through a bus 88.

The CPU 82, the ROM 83, the RAM 84, the storage 85, and the I/O 86 each have similar functions to those of the CPU 32, the ROM 33, the RANI 34, the storage 35, and the I/O 36 described above.

The CPU 82 reads a program from the storage 85 and executes the program using the RAM 84 as a work area. In the present exemplary embodiment the storage 85 stores a processing program for managing ID codes, and for collecting images captured by the vehicle 12. By executing the processing program the CPU 82 functions as a transmission section to transmit ID codes, and as a collection section to collect images.

The communication device 16B is connected to the control device 80 of the present exemplary embodiment through the I/O 86. Note that the communication device 16B may also be directly connected to the bus 88.

In the storage 85, the management server 16 of the present exemplary embodiment manages user information of users who wish to employ a delivery service to the vehicle 12. The stored user information includes data relating to personal information, such a user ID, address, contact details, and the like of a user of the vehicle 12, and data related to the ID code for unlocking the vehicle 12. Serving as the transmission section, the CPU 82 of the management server 16 sends an ID code via the communication device 16B at a predetermined timing.

Serving as the collection section, the CPU 82 of the management server 16 collects images from plural unlocking devices 26. The management server 16 stores collected images of each delivery person M by user ID. The delivery person M images are stored together with the date and time of capture, a unique ID to identify the delivery person M, and the like. A configuration may be adopted in which a user accessing the management server 16 through a smartphone or the like is able to see the captured image of the delivery person M, or in which someone on the management side is able to confirm the delivery person in response to a request from the user.

Processing Flow

Figure 8:
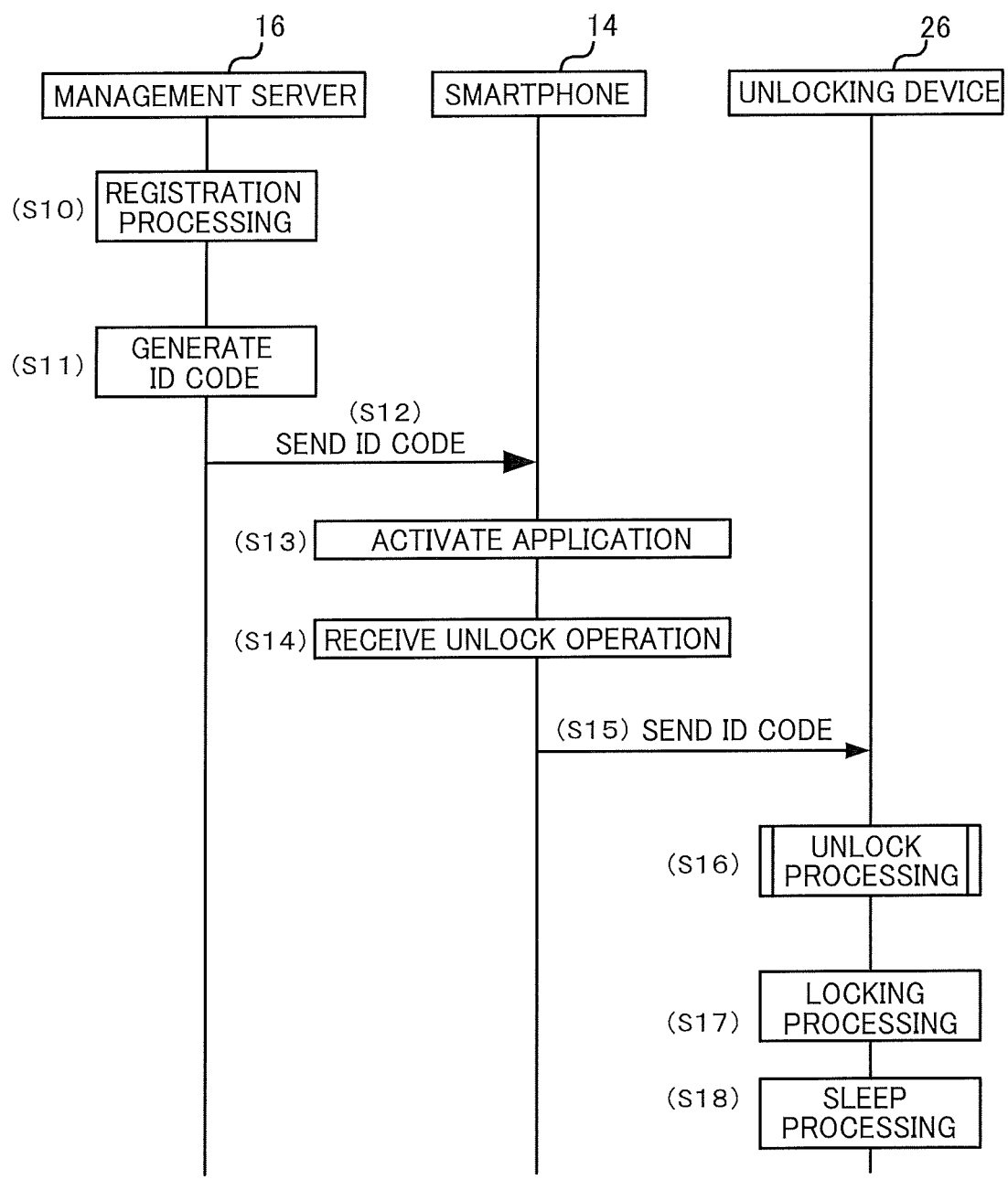
FIG. 8 is a sequence chart illustrating a flow of processing in an unlocking system of the first exemplary embodiment.

Next, explanation follows regarding the flow of processing in the unlocking system 10 of the present exemplary embodiment, with reference to the sequence chart of FIG. 8.

At step S10 of FIG. 8, the management server 16 executes registration processing to register user information of a user wishing to employ a delivery service to the vehicle 12.

At step S11, the management server 16 generates a temporary use ID code corresponding to the vehicle 12 of the user.

At step S12 the management server 16 sends the temporary use ID code to the smartphone 14. Sending of the ID code may, for example, be in response to receipt of a send request from the smartphone 14 held by the delivery person M, or alternatively on receipt of a send request from a delivery server of the delivery provider.

At step S13 an unlocking application is activated on the smartphone 14 by operation by the delivery person M present at the periphery of the vehicle 12.

At step S14 an unlock operation is received by the smartphone 14 by operation by the delivery person M (see FIG. 6).

At step S15 the smartphone 14 sends the ID code to the unlocking device 26.

At step S16 the unlocking device 26 executes unlock processing. Details of the unlock processing will be given later. When the door lock device 24 of the vehicle 12 has been unlocked by the unlock processing, the delivery person M then opens the back door 22 and is able to place the package P inside the luggage space 20 (see FIG. 2).

The unlocking device 26 then executes locking processing when the delivery person M has closed the back door 22 at step S17. The door lock device 24 of the vehicle 12 is thereby locked.

At step S18 the unlocking device 26 executes sleep processing. By doing so the power supply to at least the back monitoring camera 40 and the communication device 44 is switched OFF, and transition is made to a sleep mode.

Next, explanation follows regarding the unlock processing in the unlocking device 26 of the present exemplary embodiment.

Figure 9:
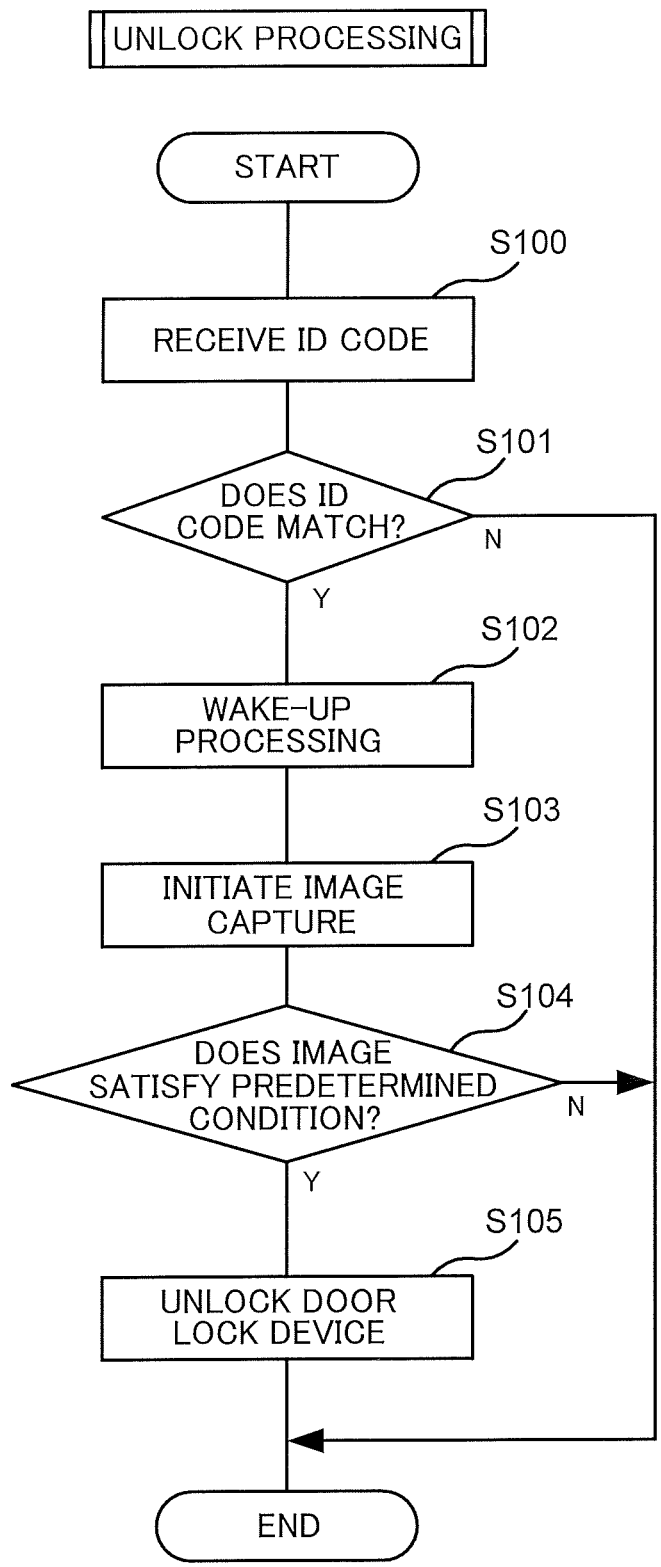
FIG. 9 is a flowchart illustrating an example of a flow of unlock processing executed in a vehicle unlocking device of the first exemplary embodiment.

At step S100 of FIG. 9, the receiver 42 receives an ID code. Processing then proceeds to step S101.

At step S101, the CPU 32 determines whether or not the received ID code matches the ID code of the vehicle 12. Namely, determination is made as to whether or not the first unlock condition has been satisfied. Processing proceeds to step S102 when the CPU 32 has determined that the received ID code matches the ID code of the vehicle 12. However, the unlock processing is ended in a case in which the CPU 32 determines that the received ID code does not match the ID code of the vehicle 12.

At step S102 the CPU 32 executes wake-up processing. Namely, the CPU 32 performs a transition from the sleep mode in which only the unlocking device 26 is active to the awake mode in which power supply to the back monitoring camera 40 and the communication device 44 is switched ON. Processing then proceeds to step S103.

At step S103 the back monitoring camera 40 initiates image capture. For example, in a case in which video images are to be captured, the back monitoring camera 40 captures images for a predetermined duration after the transition to the awake mode. Alternatively, for example, in a case in which still images are to be captured, the back monitoring camera 40 captures a predetermined number of images after the transition to the awake mode. Processing then proceeds to step S104.

At step S104 the CPU 32 determines whether or not the images captured by the back monitoring camera 40 have satisfied a predetermined condition. In the present exemplary embodiment the "predetermined condition" is a condition of an image of the delivery person M being included in the captured images. This is determination as to whether or not the second unlock condition is satisfied. Processing proceeds to step S105 when the CPU 32 determines that the images captured by the back monitoring camera 40 have satisfied the predetermined condition. However, the unlock processing is ended in a case in which the CPU 32 determines that the images captured by the back monitoring camera 40 have not satisfied the predetermined condition.

At step S105 the CPU 32 unlocks the door lock device 24. The unlock processing is then ended.

Summary of First Exemplary Embodiment

The unlocking device 26 of the present exemplary embodiment is configured so as to unlock the door lock device 24 in a case in which the received ID code is the ID code corresponding to the vehicle 12 (first unlock condition) and the image acquisition section 100 has acquired an image of the delivery person M (second unlock condition). A feature of the present exemplary embodiment is that the unlocking is performed at a point in time when the identity of the person accessing the vehicle 12 has been captured in an image. This thereby enables unauthorized unlocking of the vehicle 12 to be suppressed. Moreover, even if some sort of trouble were to occur, for example were the package P and other articles inside the luggage space 20 to go missing, an image that could be used as evidence could be preserved with certainty.

In the unlocking device 26 of the present exemplary embodiment, referencing against the ID code held by the unlocking device 26 is set as one unlock condition. This ID code is data pre-stored in the unlocking device 26 (in the ROM 33). In the present exemplary embodiment information about the delivery person M is not set as an unlock condition. Namely, there is no need for the unlocking device 26 to hold any information about the delivery person M, and there is no need to perform communication in order to acquire information about the delivery person M each time unlocking is performed. Thus by setting acquisition of an image of the delivery person M who is doing the unlocking as an unlock condition of the unlocking device 26 of the present exemplary embodiment, there is no need to retain any information about the delivery person M performing the unlocking on the vehicle 12 side in advance.

In the present exemplary embodiment there is also no need for the management server 16 to send an ID code to the smartphone 14 at the timing when unlocking is performed, since sending can be performed in advance. Thus the present exemplary embodiment enables unlocking to be performed even in situations in which the vehicle 12 and the smartphone 14 are located at a location where communications are impeded, such as in an underground parking lot or the like.

In the present exemplary embodiment an existing back monitoring camera 40 is employed to image the delivery person M. The present exemplary embodiment is accordingly able to suppress costs related to the unlocking device 26 by employing the back monitoring camera 40 that is already installed to the vehicle 12.

Since the back monitoring camera 40 of the present exemplary embodiment is built into the back door 22, when the back door 22 is opened the back monitoring camera 40 springs up in the vehicle upward direction together with the back door 22 (see FIG. 2). Namely, the back monitoring camera 40 ends up facing in a direction that makes it difficult to image the delivery person M. In the present exemplary embodiment imaging is performed prior to unlocking and opening the back door 22, thereby enabling the back monitoring camera 40 to capture an image of the whole of the delivery person M, and enabling imaging to be performed with certainty.

Moreover, in the unlocking device 26 of the present exemplary embodiment, the awake mode in which imaging is enabled is adopted in a case in which the received ID code is the ID code corresponding to the vehicle 12 (in a case in which the first unlock condition has been satisfied). The sleep mode is adopted in other cases. Namely, the present exemplary embodiment enables unnecessary power consumption to be suppressed.

The unlocking system 10 of the present exemplary embodiment supplies a temporary use ID code from the management server 16 to the smartphone 14 in order to unlock the vehicle 12. The unlocking system 10 of the present exemplary embodiment is thereby able to suppress repeated unlocking, and hence able to suppress unauthorized unlocking of the vehicle 12.

Note that although in the present exemplary embodiment application is made to unlocking of the door lock device 24 using the smartphone 14, there is no limitation thereto. Similar operation and advantageous effects can be obtained if the remote control key 50 serving as a terminal is applied to unlocking of the door lock device 24.

Modified Example 1 of First Exemplary Embodiment

In the first exemplary embodiment, acquisition of an image of the delivery person M was set as the second unlock condition. However, there are cases in which the face of the delivery person M cannot be captured in the image of the delivery person M. To address this, in Modified Example 1, a condition of the face of the delivery person M being included in excess of a predetermined proportion in the captured image is set as the second unlock condition to unlock the door lock device 24.

In Modified Example 1 the image determination section 102 determines whether or not the face of the delivery person M is included in excess of the predetermined proportion, and the lock control section 104 unlocks the door lock device 24 when more than the predetermined proportion of the face of the delivery person M is included. The "predetermined proportion" may be a freely selected value determined according to the imaging angle and the image resolution. The "predetermined condition" at step S104 is a condition of the face of the delivery person M being included in excess of the predetermined proportion in the captured image.

In the unlocking device 26 of Modified Example 1 of the present exemplary embodiment, a condition of the face of the delivery person M being captured in excess of the predetermined proportion in the captured image of the delivery person M is set as an unlock condition. Although a known face authentication method could be employed to determine the face, so doing would require advance preparation of an authentication image of the delivery person M, and would require an expensive authentication determination device. In contrast thereto, in Modified Example 1 regardless of the identity of the person accessing the vehicle 12, unlocking is performed as long as an image is acquired at a quality level enabling subsequent confirmation. Thus Modified Example 1 enables an improvement in the accuracy of identification of the delivery person M to be achieved using a simple method.

Modified Example 2 of First Exemplary Embodiment

In Modified Example 2, a condition of a predetermined element being included in the face in the captured image is set as the second unlock condition to unlock the door lock device 24.

In Modified Example 2, the image determination section 102 performs determination as to whether or not the face of the delivery person M includes the predetermined element, and the lock control section 104 unlocks the door lock device 24 when the face of the delivery person M includes the predetermined element. The "predetermined element" indicates a region of the face enabling identification of the person captured in the image, such as the eyes, nose, mouth, or the like. The "predetermined condition" at step S104 is a condition of the face of the delivery person M in the captured image including the predetermined element.

In the unlocking device 26 of Modified Example 2 of the present exemplary embodiment, inclusion of the predetermined element of the face of the delivery person M in the image is set as an unlock condition. It may be presumed that in cases in which the delivery person M has criminal intent or a person with criminal intent is impersonating the delivery person M, the person will hide part of their face, such as their eyes, mouth, or the like such that their face is not captured. To address this, in Modified Example 2 elements essential when confirming a face are included as an unlock condition, thereby enabling unlocking to be suppressed in cases in which the imaged person is not identifiable, for example due to hiding their face with sunglasses or a mask.

Second Exemplary Embodiment

Figure 10:
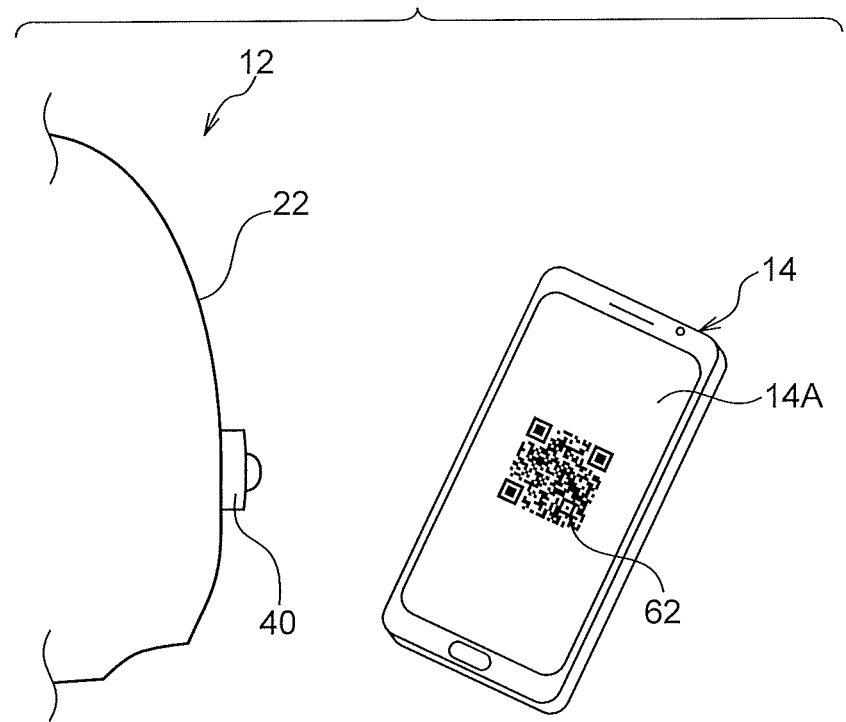
FIG. 10 is a diagram illustrating an example of imaging of a verification code in an unlocking system of a second exemplary embodiment.

In an unlocking device 26 of a second exemplary embodiment, as illustrated in FIG. 10, a verification code 62 displayed on a touch panel 14A of a smartphone 14 is imaged by a back monitoring camera 40, and a condition of being able to acquire ID information capable of identifying the delivery person M from the imaged verification code 62 is set as an unlock condition.

Explanation follows regarding points of difference from the first exemplary embodiment. Note that configuration similar to that of the first exemplary embodiment is appended with the same reference numerals, and explanation thereof is omitted.

In the present exemplary embodiment, the smartphone 14 assembles a token serving as identification information assigned to each vehicle together with ID information serving as unique information and encrypts the assembled information to generate a verification code 62 serving as an identification image. In the present exemplary embodiment a QR code (registered trademark) is employed as the verification code 62, however there is no limitation thereto, and a barcode, or a combination of numbers and letters, may be employed as the verification code. The unlocking device 26 decrypts the imaged verification code 62, and extracts the token and the ID information. The ID information of the present exemplary embodiment is unique terminal information for the smartphone 14 or the like. The token of the present exemplary embodiment is a rolling code type token that changes on each occasion, and is for temporary use in the smartphone 14.

Vehicle

The unlocking device 26 stores the token in the ROM 33.

Figure 11:
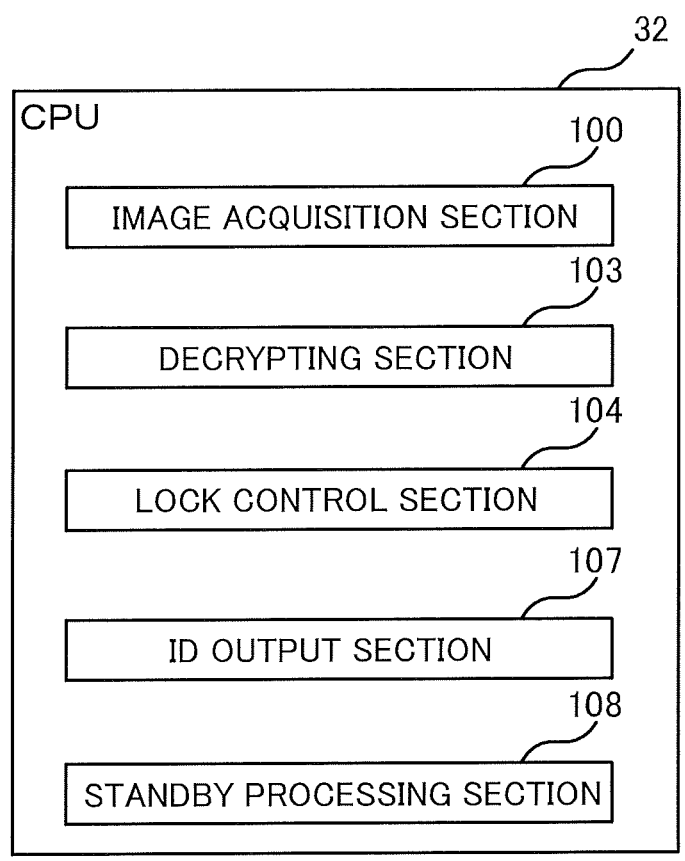
FIG. 11 is a block diagram illustrating an example of a functional configuration of a CPU in a vehicle unlocking device of the second exemplary embodiment.

FIG. 11 is a block diagram illustrating an example of a functional configuration of a CPU 32 in the unlocking device 26 of the present exemplary embodiment. As illustrated in FIG. 11, the CPU 32 includes an image acquisition section 100, a decrypting section 103, a lock control section 104, an ID output section 107, and a standby processing section 108.

The decrypting section 103 serving as an extraction section includes functionality for decrypting information relating to a captured verification code 62, and for extracting the token and the ID information.

The lock control section 104 serving as a control section includes functionality to control the unlocking device 26. In the present exemplary embodiment, a condition of the decrypted token being the token corresponding to the vehicle 12 is set as a first unlock condition for unlocking, and a condition of acquiring the ID information extracted by the decrypting section 103 is set as a second unlock condition. The lock control section 104 then unlocks the door lock device 24 in a case in which both the first unlock condition and the second unlock condition have been satisfied. When acquiring the ID information, determination may be performed as to whether or not the ID information extracted by decrypting is valid ID information. For example, the lock control section 104 may employ error check data such as size data, check digits, or the like to determine whether there is an error in the extracted ID information, and ID information without error acquired as valid ID information.

The ID output section 107 includes functionality to output the ID information extracted by the decrypting section 103 to the management server 16. Specifically, the ID output section 107 sends ID information temporarily stored in the RAM 34, or ID information stored in the storage 35, to the management server 16 via the communication device 44.

The standby processing section 108 serving as a processing section includes functionality to control power supply to the back monitoring camera 40 and the communication device 44. The standby processing section 108 of the present exemplary embodiment transitions from a sleep mode to an awake mode in a case in which a back door open switch 24B, which is a predetermined switch, has been operated.

Smartphone

Figure 12:
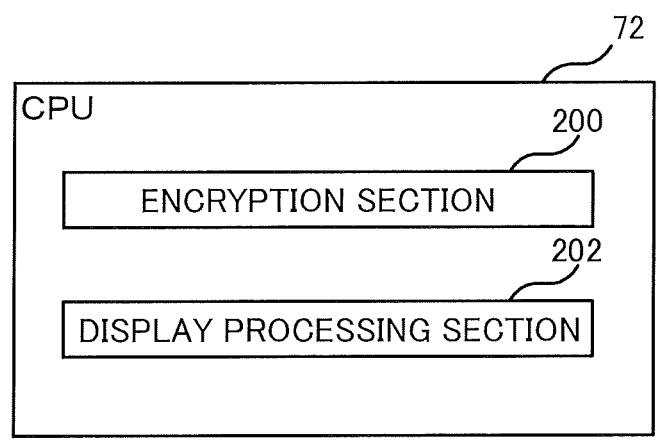
FIG. 12 is a block diagram illustrating an example of a functional configuration of a CPU in a smartphone of the second exemplary embodiment.

FIG. 12 is a block diagram illustrating an example of a functional configuration of a CPU 72 in a smartphone 14 of the present exemplary embodiment. As illustrated in FIG. 12, the CPU 72 includes an encryption section 200 and a display processing section 202.

The encryption section 200 includes functionality to assemble a token received from the management server 16 together with ID information for the smartphone 14 (for example, stored in the ROM 73) and encrypt these to generate a verification code 62.

The display processing section 202 includes functionality to display the verification code 62 generated by the encryption section 200 on the touch panel 14A.

Flow of Processing

Explanation next follows regarding a flow of processing in the unlocking system 10 of the present exemplary embodiment, with reference to the sequence chart of FIG. 13.

The processing of step S20 is similar to that of step S10 described above (see FIG. 8).

At step S21, the management server 16 generates a temporary use token corresponding to the vehicle 12 of the user.

At step S22, the management server 16 sends the temporary use token to the smartphone 14. Sending of the token may, for example, be in response to receipt of a send request from the smartphone 14 held by the delivery person M, or alternatively on receipt of a send request from a delivery server of the delivery provider.

The processing of step S23 is similar to that of step S13 described above (see FIG. 8).

At step S24, the CPU 72 executes encryption processing in the smartphone 14.

At step S25, the CPU 72 displays the verification code 62 on the touch panel 14A of the smartphone 14. Note that display of the verification code 62 may be ended by operation by the delivery person M, or may be ended after a predetermined duration has elapsed.

The processing of step S26 to step S28 is similar to that of step S16 to step S18 described above (see FIG. 8).

Next, description follows regarding the unlock processing in the unlocking device 26 of the present exemplary embodiment.

At step S200 of FIG. 14, the CPU 32 determines whether or not back door open switch 24B has been operated. Processing proceeds to step S201 when the CPU 32 has determined that the back door open switch 24B has been operated. However, step S200 is repeated when the CPU 32 has determined that the back door open switch 24B has not been operated.

At step S201, the CPU 32 executes wake-up processing. Namely, the CPU 32 transitions from the sleep mode in which only the unlocking device 26 is active to the awake mode in which the power supply to the back monitoring camera 40 and the communication device 44 is switched ON. Processing then proceeds to step S202.

At step S202, the back monitoring camera 40 initiates imaging. Processing then proceeds to step S203.

At step S203 the CPU 32 determines whether or not an image of the verification code 62 has been acquired from the image captured by the back monitoring camera 40. Processing proceeds to step S204 when the CPU 32 determines that an image of the verification code 62 has been acquired. However, processing returns to step S202 when the CPU 32 determines that an image of the verification code 62 has not been acquired. Namely, imaging is continued until the verification code 62 can be acquired.

At step S204, the CPU 32 performs decryption processing of the information acquired from the verification code 62. The token and the ID information are extracted thereby. Processing then proceeds to step S205.

At step S205, the CPU 32 determines whether or not the extracted token matches the token of the vehicle 12. Namely, the CPU 32 determines whether or not the first unlock condition has been satisfied. Processing proceeds to step S206 when the CPU 32 determines that the extracted token matches the token of the vehicle 12. However, the unlock processing is ended in a case in which the CPU 32 determines that the extracted token does not match the token of the vehicle 12.

At step S206, the CPU 32 determines whether or not ID information has been acquired. Namely, the CPU 32 determines whether or not the second unlock condition has been satisfied. Processing proceeds to step S207 when the CPU 32 has determined that the ID information has been acquired. However, the unlock processing is ended in a case in which the CPU 32 determines that the ID information has not been acquired.

At step S207, the CPU 32 unlocks the door lock device 24. The unlock processing is then ended.

Summary of Second Exemplary Embodiment

The unlocking device 26 of the present exemplary embodiment is configured so as to unlock the door lock device 24 when both the extracted token from the acquired verification code 62 is the token corresponding to the vehicle 12 (first unlock condition) and ID information extracted from the verification code 62 has been acquired (second unlock condition). A feature of the present exemplary embodiment is that unlocking is performed at a point in time when the ID information capable of identifying the person accessing the vehicle 12 has been acquired. This thereby enables unauthorized unlocking of the vehicle 12 to be suppressed. Moreover, even if some sort of trouble were to occur, for example were the package P and other articles inside the luggage space 20 to go missing, the delivery person M associated with the ID information can be identified.

Moreover, in the unlocking device 26 of the present exemplary embodiment, referencing against the token held in the unlocking device 26 is set as one unlock condition. The token is data pre-stored in the unlocking device 26 (the ROM 33). In the present exemplary embodiment information about the delivery person M is not set as an unlock condition. Namely, there is no need for the unlocking device 26 to hold any information about the delivery person M, and there is no need to perform communication in order to acquire information about the delivery person M each time unlocking is performed. Thus by setting acquisition of the ID information associated with the delivery person M who is performing the unlocking as an unlock condition of the unlocking device 26 of the present exemplary embodiment, there is no need to retain any information about the delivery person M performing the unlocking on the vehicle 12 side in advance.

Note that although in the present exemplary embodiment the ID information is unique terminal information for the smartphone 14, there is no limitation thereto, and login information for an application on the smartphone 14 or the like, or personal information about the delivery person M may be employed as the ID information.

Moreover, although the timing for transitioning from the sleep mode to the awake mode in the unlocking device 26 of the present exemplary embodiment is operation of the back door open switch 24B, there is no limitation thereto. For example, an ID code may be sent from the smartphone 14 as in the first exemplary embodiment, and the timing for transitioning to the awake mode may be when determined in the unlocking device 26 that the received ID code matches the ID code of the vehicle 12.

REMARKS

Although the terminal carried by the delivery person M is the smartphone 14 in each of the exemplary embodiments described above, there is no limitation thereto, and the terminal may be any device including a communication function, such as a tablet computer, a wearable computer, or the like.

Moreover, although the back monitoring camera 40 is employed as the imaging section in the vehicle 12 of each of the exemplary embodiments, there is no limitation thereto, and the imaging section may be any camera pre-installed in the vehicle for an occupant to observe the outside of the vehicle, such as a camera employed as a blind spot monitor, an electronic mirror, or the like.

Moreover, although in each of the exemplary embodiments examples have been given of cases in which the back door 22 is opened and the package P is placed in the luggage space 20, there is no limitation thereto. The present disclosure may be applied to cases in which a trunk lid is opened and the package P is placed in the trunk space, and to cases in which a side door is opened and the package P is placed in the vehicle cabin 21.

Note that although various processing is executed by the CPUs 32, 72, 82 reading software (programs) in each of the exemplary embodiments, the various processing may be executed by various processors other than the CPUs. Examples of such processors include programmable logic devices (PLD) with circuit configurations that are reconfigurable after manufacture, such as field-programmable gate arrays (FPGA), dedicated electronic circuits that are processors including circuit configurations custom designed to execute specific processing such as application specific integrated circuits (ASIC) or the like. Moreover, the various processing may be executed by one type of processor, or may be executed by a combination of two or more processors of the same type or different types (for example, plural FPGAs, a combination of a CPU and an FPGA, etc.). Moreover, the hardware structure of such types of processor is more specifically an electronic circuit combining circuit elements such as semiconductor elements and the like.

Moreover, in the exemplary embodiments described above cases have been described in which each of the programs is pre-stored (pre-installed) on a non-transitory computer readable recording medium. For example, the execution program of the unlocking device 26 is pre-stored in the ROM 33, and the application program of the smartphone 14 is pre-stored in the ROM 73. Moreover, for example, the processing program of the management server 16 is pre-stored in the storage 85. There is, however, no limitation thereto, and each of the programs may be provided in a format recorded on a non-transitory recording medium such as compact disc read only memory (CD-ROM), digital versatile disc read only memory (DVD-ROM), or universal serial bus (USB) memory. Moreover, each of the programs may be provided in a format to be downloaded from an external device over a network.

The flows of processing explained for the above exemplary embodiments are also merely examples thereof, and superfluous steps may be eliminated, new steps may be added, and the sequence of processing may be changed within a range not departing from the spirit of the present disclosure.

Furthermore, the configurations of each of the control devices, the management server, and the smartphone as explained in the exemplary embodiments above are also merely examples thereof, and changes may be made thereto according to the circumstances, within a range not departing from the spirit of the present disclosure.

What is claimed is:

1. A vehicle unlocking device, comprising:
   a memory;
   a processor connected to the memory; and
   a reception section configured to receive identification information assigned to respective vehicles from a terminal carried by a person present at a periphery of a specific vehicle that is one of the respective vehicles, the terminal carried by the person being connectable to a public network and being different from a specific terminal for unlocking the specific vehicle,
   the processor being configured to:
   in a case in which the identification information that has been received is identification information corresponding to the specific vehicle:
      turn on a power supply to an imaging section provided at the specific vehicle, and
   in a case in which:
      the identification information that has been received is the identification information corresponding to the specific vehicle, and
      an image including a face of the person in excess of a predetermined proportion has been acquired by the imaging section to which the power supply has been turned on:
         unlock a lock unit of the specific vehicle regardless of an identity of the person included in the image including the face of the person in excess of the predetermined proportion.

2. The vehicle unlocking device according to claim 1, wherein the processor is configured to unlock the lock unit in a case in which:
   the identification information that has been received is identification information corresponding to the specific vehicle, and
   an image including a predetermined element of a face of the person has been acquired.

3. The vehicle unlocking device according to claim 1, wherein the processor effects control so as to implement a state enabling the image to be captured in a case in which the identification information that has been received is the identification information corresponding to the specific vehicle.

4. A vehicle, comprising:
the vehicle unlocking device of claim 1, wherein
the imaging section is provided in order for an occupant to observe an exterior of the vehicle, and
the lock unit is configured to lock and unlock an opening-closing section that separates an interior of the vehicle from the exterior of the vehicle.

5. An unlocking system, comprising:
the vehicle of claim 4;
a server, the server containing the identification information as temporary use identification information; and
the terminal, the terminal being configured to receive the identification information when the identification information is sent from the server.

6. A non-transitory storage medium storing a program that is executable by a computer to implement unlock processing, the unlock processing comprising:
receiving identification information from a terminal carried by a person present at a periphery of a specific vehicle that is a specific one of respective vehicles, the terminal carried by the person being connectable to a public network and being different from a specific terminal for unlocking the specific vehicle;
when the identification information that has been received is identification information corresponding to the specific vehicle:
turning on a power supply to an imaging section provided at the specific vehicle; and
when:
the identification information that has been received is the identification information corresponding to the specific vehicle, and
an image including a face of the person in excess of a predetermined proportion has been acquired by the imaging section to which the power supply has been turned on:
unlocking a lock unit of the specific vehicle regardless of an identity of the person included in the image including the face of the person in excess of the predetermined proportion.

7. The non-transitory storage medium according to claim 6, wherein the unlock processing further comprises unlocking the lock unit of the specific vehicle when:
the identification information that has been received is identification information corresponding to the specific vehicle, and
an image including a predetermined element of a face of the person has been acquired.

8. The non-transitory storage medium according to claim 6, wherein the unlock processing further comprises effecting control so as to implement a state enabling the image to be captured in a case in which the identification information that has been received is the identification information corresponding to the specific vehicle.

9. A method, comprising:
receiving identification information from a terminal carried by a person present at a periphery of a specific vehicle that is a specific one of respective vehicles, the terminal carried by the person being connectable to a public network and being different from a specific terminal for unlocking the specific vehicle;
when the identification information that has been received is identification information corresponding to the specific vehicle:
turning on a power supply to an imaging section provided at the specific vehicle; and
when:
the identification information that has been received is identification information corresponding to the specific vehicle, and
an image including a face of the person in excess of a predetermined proportion has been acquired by the imaging section to which the power supply has been turned on:
unlocking a lock unit of the specific vehicle regardless of an identity of the person included in the image including the face of the person in excess of the predetermined proportion.

10. The method according to claim 9, further comprising unlocking the lock unit of the specific vehicle when:
the identification information that has been received is identification information corresponding to the specific vehicle, and
an image including a predetermined element of a face of the person has been acquired.

11. The method according to claim 9, further comprising effecting control so as to implement a state enabling the image to be captured in a case in which the identification information that has been received is the identification information corresponding to the specific vehicle.

* * * * *